(12) United States Patent
Masuzaki et al.

(10) Patent No.: US 11,042,737 B2
(45) Date of Patent: Jun. 22, 2021

(54) LEARNING DEVICE, LEARNING METHOD AND PROGRAM

(71) Applicant: Mitsubishi Electric Corporation, Tokyo (JP)

(72) Inventors: Takahiko Masuzaki, Tokyo (JP); Osamu Nasu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/051,440

(22) PCT Filed: Jun. 21, 2018

(86) PCT No.: PCT/JP2018/023575
§ 371 (c)(1),
(2) Date: Oct. 29, 2020

(87) PCT Pub. No.: WO2019/244295
PCT Pub. Date: Dec. 26, 2019

(65) Prior Publication Data
US 2021/0089768 A1    Mar. 25, 2021

(51) Int. Cl.
G06K 9/00    (2006.01)
G06N 20/00    (2019.01)
G06K 9/62    (2006.01)

(52) U.S. Cl.
CPC ....... G06K 9/00503 (2013.01); G06K 9/0053 (2013.01); G06K 9/0055 (2013.01);
(Continued)

(58) Field of Classification Search
CPC ............ G06K 9/00503; G06K 9/6256; G06K 9/0053; G06K 9/6215; G06K 9/0055; G06N 20/00
See application file for complete search history.

(56) References Cited

U.S. PATENT DOCUMENTS 8,332,346 B1 * 12/2012 To .................. G06K 9/6226
706/52
2016/0004620 A1    1/2016 Ohike

FOREIGN PATENT DOCUMENTS

JP    H05282269 A   * 10/1983   ............ G06F 15/18
JP    7-230446 A    8/1995
(Continued)

OTHER PUBLICATIONS

International Search Report and Written Opinion dated Sep. 18, 2018 for PCT/JP2018/023575 filed on Jun. 21, 2018, 9 pages including English Translation of the International Search Report.
(Continued)

*Primary Examiner* — Zhitong Chen
(74) *Attorney, Agent, or Firm* — Xsensus LLP

(57) ABSTRACT

A learning device (10) includes an acquirer (11), a learner (12), and a generator (14). The acquirer (11) acquires a learning signal. The learner (12) performs, in accordance with similarities indicating degrees of similarity between waveforms, clustering of partial signals cut out from the learning signal acquired by the acquirer (11), and learns reference waveforms that each indicate a waveform of a corresponding partial signal of the clustered partial signals. The generator (14) generates, based on at least one of a distribution of the similarities or characteristics of clusters that each include a corresponding partial signal of the clustered partial signals, progress information indicating a progress status of the learning by the learner (12), and outputs the progress information.

16 Claims, 15 Drawing Sheets

(52) U.S. Cl.
CPC ......... *G06K 9/6215* (2013.01); *G06K 9/6256* (2013.01); *G06N 20/00* (2019.01)

(56) References Cited

FOREIGN PATENT DOCUMENTS

| | | | | |
|---|---|---|---|---|
| JP | 2004-93671 A | | 3/2004 | |
| JP | 2009-135649 A | | 6/2009 | |
| JP | 2009135649 A | * | 6/2009 | ............ H04L 12/66 |
| JP | 2011-34389 A | | 2/2011 | |
| WO | 2014/184928 A1 | | 11/2014 | |

OTHER PUBLICATIONS

Office Action received for Japanese Patent Application No. 2019-531360, dated Jul. 9, 2019, 6 pages including English Translation.
Office Action received for Japanese Patent Application No. 2019-531360, dated Oct. 15, 2019, 5 pages including English Translation.
Decision to Grant a Patent received for Japanese Patent Application No. 2019-531360, dated Dec. 10, 2019, 5 pages including English Translation.

* cited by examiner

US 11,042,737 B2

LEARNING DEVICE, LEARNING METHOD AND PROGRAM

CROSS-REFERENCE TO RELATED APPLICATIONS

The present application is based on PCT filing PCT/JP2018/023575, filed Jun. 21, 2018, the entire contents of which are incorporated herein by reference.

TECHNICAL FIELD

The present disclosure relates to a learning device, a learning method, and a program.

BACKGROUND ART

Various types of processing systems that utilize time-series data indicating a result of sensing by a sensor, such as a production system and a control system in a factory, are known. Diagnosis for abnormality in such processing systems is widely performed by comparing the time-series data with data to be input during normal operation.

The data to be input during normal operation is required to be learned, as data indicating typical patterns, from time-series data collected within periods during which no abnormality occurs. Here, insufficient learning of such typical patterns results in decrease in accuracy of diagnosis for abnormality. Conversely, excessive continuation of learning results in wasting of calculation resources for learning. Thus a technique is proposed in which learning terminates at an appropriate point in time (refer to, for example, Patent Literature 1).

Patent Literature 1 discloses a technique of performing pattern classification using scores of principal components of time-series data and ending learning after a number of patterns converges. According to this technique, values that each are representative of scores of principal components belonging to a corresponding pattern of the patterns are output as learning data to be used for abnormality detection.

CITATION LIST

Patent Literature

Patent Literature 1: Unexamined Japanese Patent Application Publication No. 2009-135649

SUMMARY OF INVENTION

Technical Problem

Comparison of signal waveforms is sometimes performed for abnormality detection, and learning of waveforms is to be performed for such comparison. Here, such learning of waveforms for detection of abnormality by comparison of signal waveforms sometimes proceeds, even after convergence of the number of patterns, while the number of patterns remains fixed within a certain range. Thus, in employing the technique of Patent Literature 1 that includes ending learning depending on the number of patterns, learning may be ended at a point in time that is inappropriate for the comparison of signal waveforms.

The present disclosure is made in view of the above-described circumstances, and an objective of the present disclosure is to achieve ending of learning of comparing signal waveforms at a more appropriate point in time.

Solution to Problem

To achieve the aforementioned objective, a learning device according to the present disclosure includes:
acquisition means for acquiring a learning signal;
learning means for (i) performing, in accordance with similarities indicating degrees of similarity between waveforms, clustering of a plurality of partial signals cut out from the learning signal acquired by the acquisition means and (ii) learning reference waveforms that each indicate a waveform of a corresponding partial signal of the clustered partial signals; and
generation means for (i) generating, based on at least one of a distribution of the similarities or characteristics of clusters that each include a corresponding partial signal of the clustered partial signals, progress information indicating a progress status of the learning by the teaming means and (ii) outputting the progress information.

Advantageous Effects of Invention

According to the present disclosure, the reference waveforms are learned from the learning signal, and the progress information is generated based on at least one of (i) a distribution of the similarities or (ii) characteristics of clusters that each include a corresponding partial signal of the clustered partial signals. Utilizing such progress information can achieve, when teaming of reference waveforms performed as a result of clustering based on the similarities progresses to a certain degree, termination of the learning. Thus, ending of learning for comparing of signal waveforms at a more appropriate point in time can be achieved.

DESCRIPTION OF EMBODIMENTS

Hereinafter, a learning device 10 according to an embodiment of the present disclosure is described in detail with reference to the drawings.

EMBODIMENT

The learning device 10 according to the present embodiment is a device that acquires a learning signal provided from an exterior and learns representative waveforms included in the learning signal. The waveforms learned by the learning device 10 are utilized to detect abnormality in comparison with waveforms of a signal collected by a production system formed in a factory.

The abnormality includes, for example, deviation from specification of a workpiece transported on a production line, malfunctioning of a device included in the production line, and errors that occur during operation of the device. The abnormality means a state that is different from a normal state predetermined and assumed by an operator of the production system, and generally causes stopping of production, or lowering of yield of a product produced by the production system. During operation of the production system, a signal collected by this production system has a waveform that is similar to any one of a plurality of waveform patterns. Thus, when an input signal has a waveform that deviates from each of the plurality of waveform patterns, a determination is made that an abnormality occurs. The learning device 10 learns waveform patterns used for determining as to whether an abnormality occurs. Hereinafter, a waveform pattern that serves as a reference for determining as to whether an abnormality occurs is referred to as a reference waveform.

Figure 1:
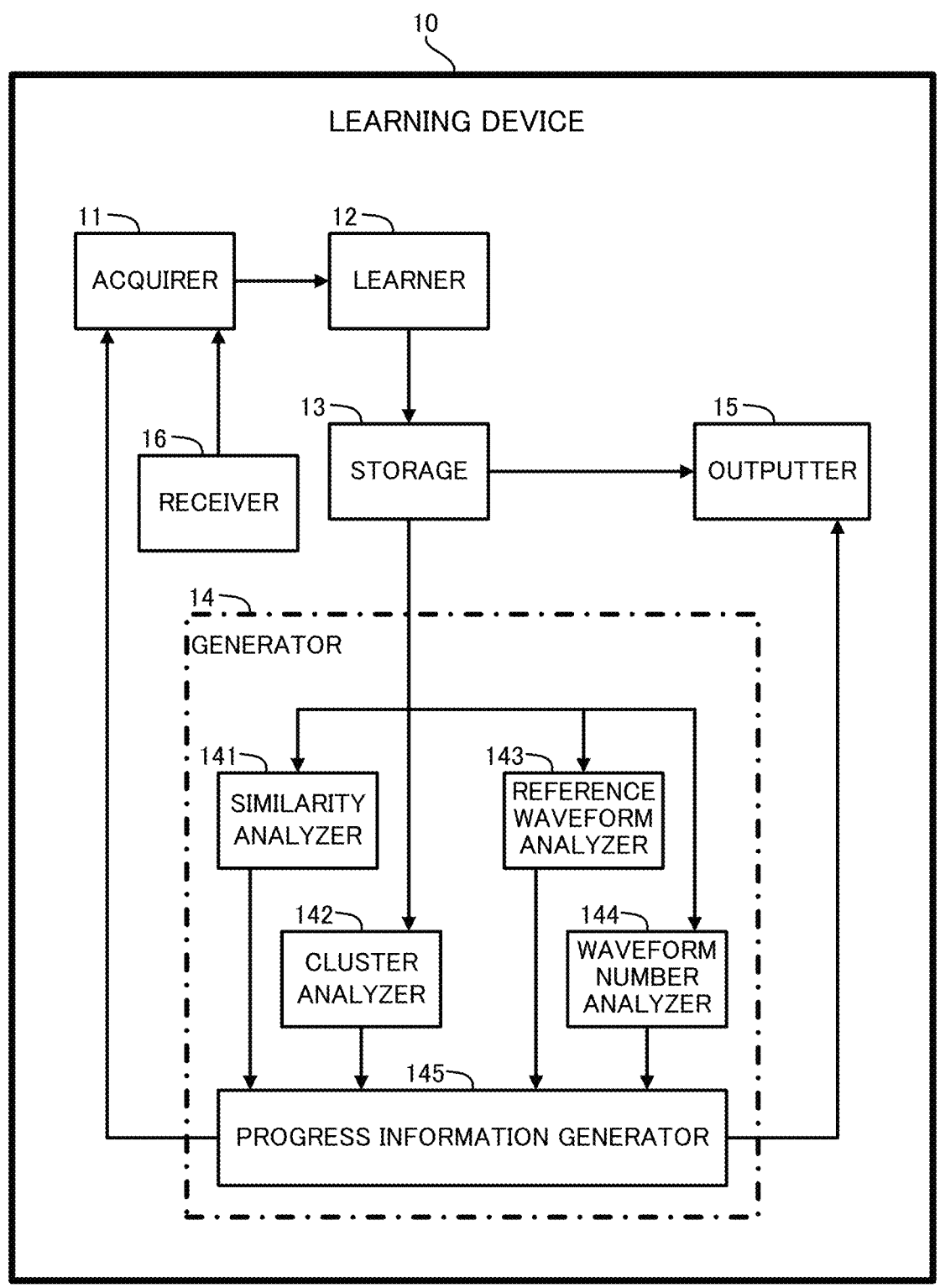
FIG. 1 is a block diagram illustrating functional configuration of a learning device according to an embodiment of the present disclosure.

As illustrated in FIG. 1, the learning device 10 functionally includes: an acquirer 11 that acquires a learning signal; a learner 12 that learns a reference waveform from the learning signal; a storage 13 that stores various types of data including a result of the learning; a generator 14 that generates, based on the data stored in the storage 13, progress information indicating a progress status of the learning; an outputter 15 that outputs the progress information to an exterior; and a receiver 16 that receives from a user an instruction relating to execution of the learning.

The acquirer 11 acquires a plurality of the learning signals. Specifically, the acquirer 11 acquires the learning signal repeatedly. More specifically, the acquirer 11 acquires a source signal provided by the user and acquires the learning signal repeatedly by dividing this source signal, thereby acquiring the learning signals in ascending order of length. The acquirer 11, with each acquiring of the learning signal, transmits the acquired learning signal to the learner 12. The source signal has waveforms of a signal to be collected during normal operation of the production system. The source signal is prepared by the user in advance. The acquirer 11 functions as the acquisition means in the claims.

Figure 2:
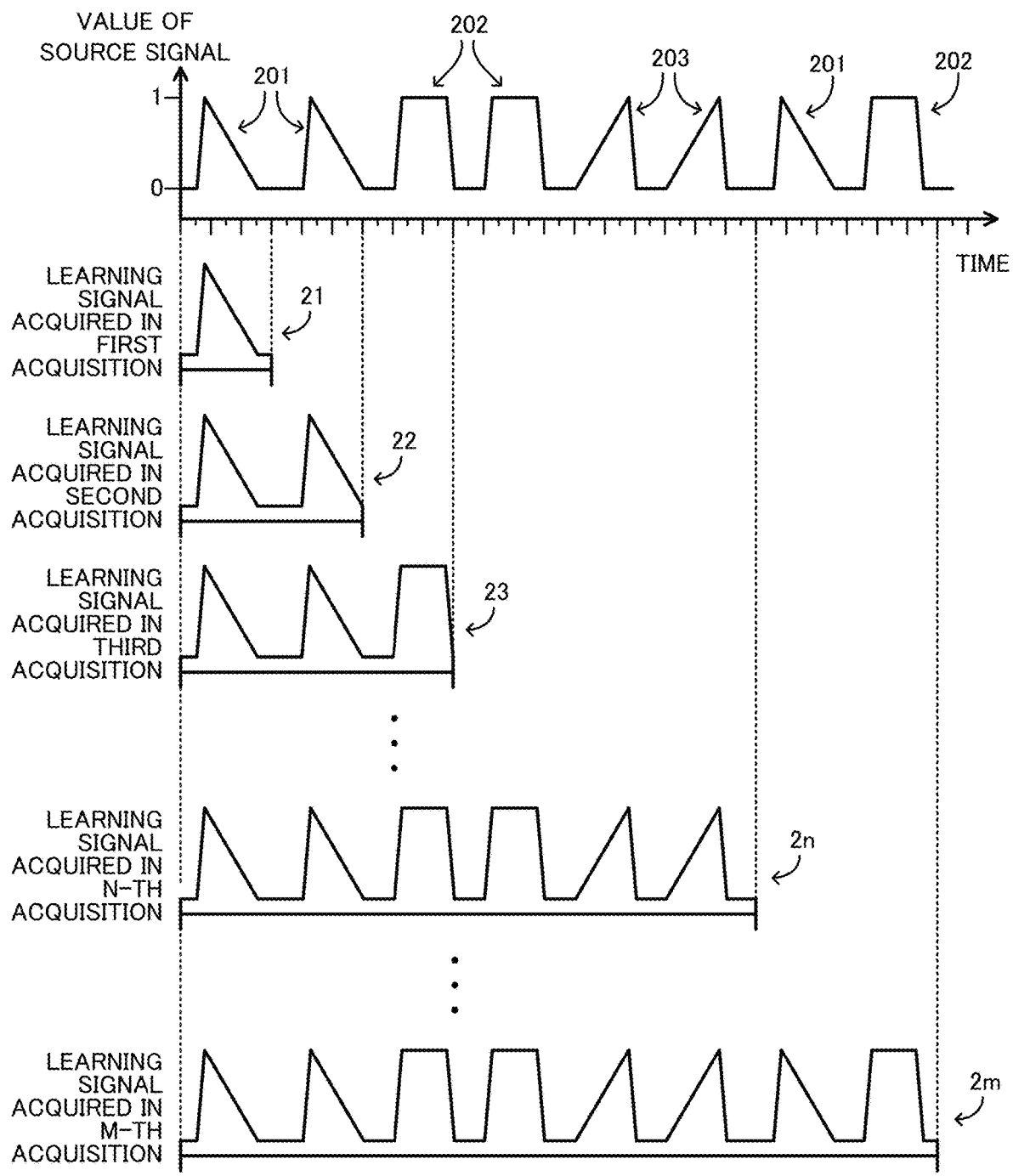
FIG. 2 is a diagram for explanation of learning signals acquired by an acquirer according to the embodiment.

FIG. 2 schematically illustrates the learning signals acquired by the acquirer 11. As illustrated in the upper part of FIG. 2, the source signal has a waveform 201 with a precipitous rise followed by a gentle decline, a waveform 202 with a trapezoidal shape, and a waveform 203 with a gentle rise followed by a precipitous decline. The acquirer 11 cuts out and acquires a learning signal 21 from the source signal. Thereafter, the acquirer 11 cuts out and acquires, from the source signal, a learning signal 22 having a length longer than that of the learning signal 21 acquired in the first acquisition. Similarly, the acquirer 11 cuts out and acquires a learning signal 23 having a length longer than that of the learning signal 22 acquired in the second acquisition.

The learning signals 21 and 22 have the waveform 201 but do not have the waveforms 202 and 203. Further, the learning signal 23 has the waveforms 201 and 202 but does not have the waveform 203. Thus, the learning signals 21-23 are signals insufficient for learning of waveforms.

The acquirer 11 acquires, as a signal in an N-th acquisition, a learning signal 2n. The learning signal 2n has all of the waveforms 201, 202, and 203 and thus can be said to be a signal having a length sufficient for learning of waveforms. Further, the acquirer 11 acquires, as a signal in an M-th acquisition, a learning signal 2m. Although the learning can proceed further by using the learning signal 2m rather than using the learning signal 2n, any of the waveforms 201-203 included in the source signal can be learned from the learning signal 2n. Thus learning by use of the learning signal 2m may be excessive and result in wasting of calculation resources.

However, FIG. 2 illustrates the learning signals schematically, and a given type of waveform is preferably learned from a plurality of the waveforms rather than from a single instance of the waveform included in a learning signal.

Again with reference to FIG. 1, the learner 12, with each acquisition by the acquirer 11 of the learning signal, learns reference waveforms from the learning signal. Specifically, the learner 12 performs clustering of partial signals cut out from the learning signal in accordance with degrees of similarity between waveforms, and learns reference waveforms that each indicate a waveform of a corresponding partial signal of the clustered partial signals. The learner 12 functions as the learning means in the claims.

Here, an outline of leaning by the learner 12 of the reference waveforms is explained with reference to FIG. 3. As illustrated in the upper part of FIG. 3, the learner 12 divides the learning signal into a learning partial signal to be used for learning of the reference waveforms and a trial signal to be processed by the generator 14 described later. Specifically, the learner 12 divides the learning signal equally. However, this is not limiting, and any methods that can divide the learning signal may be employed.

The learner 12, with each sliding of a window 31, cuts out from the learning partial signal a series of learning values, thereby generating a partial signal 32. The partial signal 32 is treated as a vector whose elements are the learning values of the cutout series. Then the learner 12 performs clustering of a plurality of the partial signals using the degrees of similarity between waveforms. FIG. 3 illustrates an example of performing clustering of the partial signals into groups G1, G2, and G3. Specifically, the learner 12 performs clustering in accordance with distances between the signals that serve as vectors. The distance between the signals that serve as vectors can be obtained by calculating a sum of square errors between elements included in the vectors and calculating a square root of the sum. The clustering is described later in detail.

Each of the groups G1, G2, and G3 that are formed as a result of the clustering by the learner 12 includes partial signals that have waveforms similar to each other. Each of the groups G1, G2, and G3 corresponds to a cluster. The learner 12 determines, for each group, a reference waveform indicating the waveforms of partial signals included in the corresponding group. The reference waveform may be a waveform corresponding to a mean value of the partial signals included in the corresponding group, a partial signal selected from the partial signals included in the corresponding group, or a partial signal at the cluster center. According to the example illustrated in FIG. 3, a reference waveform A corresponding to the group G1, a reference waveform B corresponding to the group G2, and a reference waveform C corresponding to the group G3 are learned.

Again with reference to FIG. 1, the learner 12 stores, in the storage 13, data indicating (i) the trial signal into which the learning signal is divided, (ii) the learned reference waveforms, and (iii) the partial signals clustered into various groups.

The generator 14 reads the data stored in the storage 13 and generates, based on at least one of a distribution of similarities or characteristics of clusters that each include the corresponding partial signals of the clustered partial signals, progress information indicating a progress status of the learning of reference waveforms, and outputs the progress information. Specifically, the generator 14 calculates index values relating to the reference waveforms, generates the progress information based on the index values, and outputs the progress information. The generator 14 function as the generation means in the claims. The generator 14 includes a similarity analyzer 141 that calculates a first index value, a cluster analyzer 142 that calculates a second index value, a reference waveform analyzer 143 that calculates a third index value, a waveform number analyzer 144 that calculates a fourth index value, and a progress information generator 145 that generates the progress information based on the index values.

The similarity analyzer 141 calculates similarities between the trial signal and the reference waveforms and analyzes the distribution of the similarities, thereby calculating the first index value. Although the similarity indicates a degree of similarity between waveforms, the similarity may be different from the distance between signals described above. The similarity is a value that ranges from zero to 1 and takes a value of 1 in the case of matching of the waveforms. The similarity is calculated by normalizing a sum of square errors between sampling values of pairs of signals. For example, when the sum of square errors is expressed by E, a similarity D is calculated using the formula (1) below.

$$D=1/(1+E) \qquad (1)$$

Figure 4:
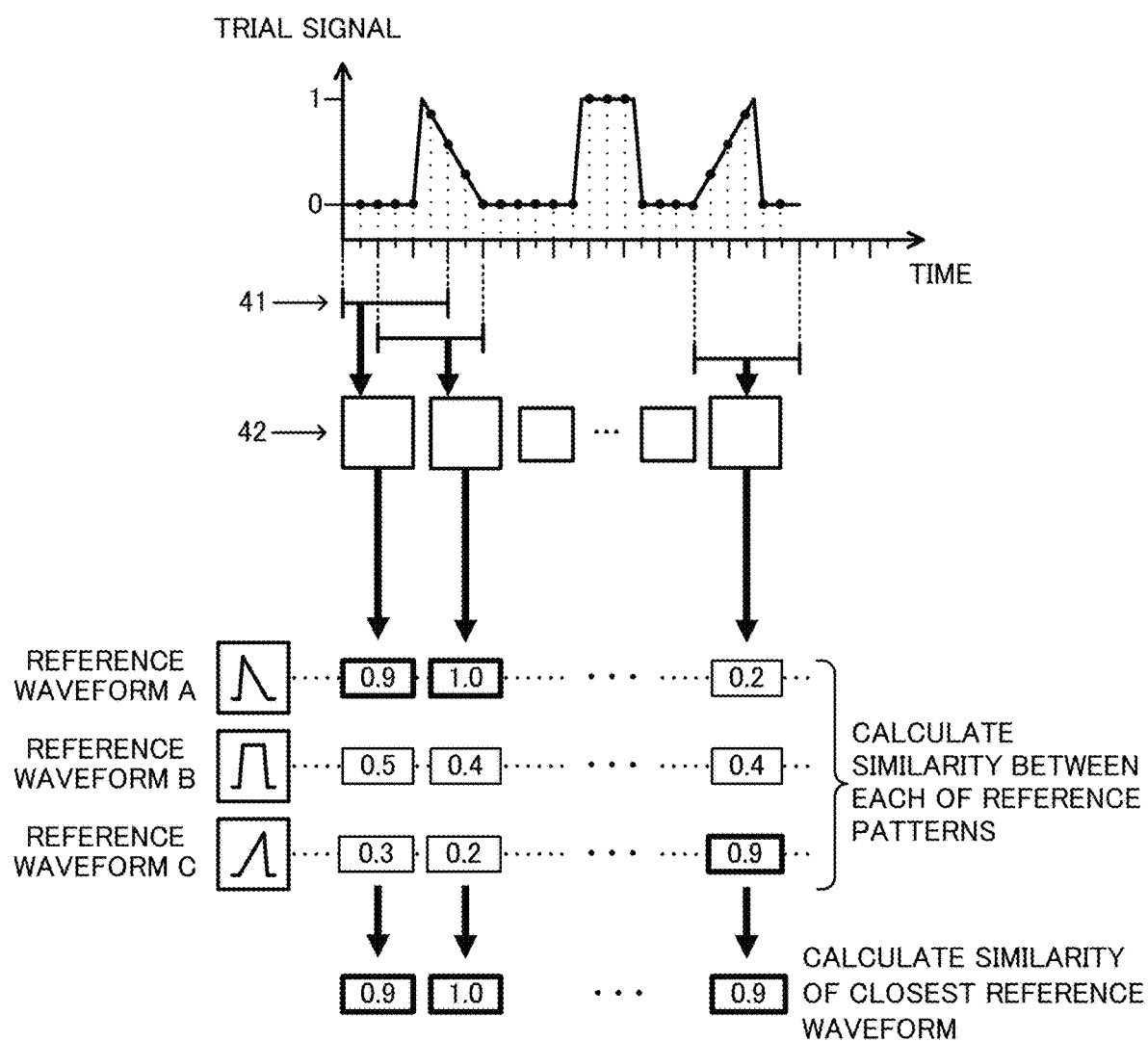
FIG. 4 is a diagram for explanation of calculation of similarities performed by a generator according to the embodiment.

FIG. 4 illustrates an outline of a method of calculating the similarities from the trial signal. This calculation of similarities is performed in a manner similar to that used in calculating, after ending of the learning, similarities to be used for detecting whether an abnormality occurs. The calculation of similarities performed by the similarity analyzer 141 is a calculation processing by trying calculation of similarities to check the progress status of the learning.

Specifically, the similarity analyzer 141 performs sliding of a window 41 to cut out a series of trial values from the trial signal, thereby generating partial signals 42. Each of the partial signals 42 is treated as a vector in a manner similar to that of the partial signal 32 illustrated in FIG. 3. Then the similarity analyzer 141 calculates, for each partial signal 42, similarities between the corresponding partial signal 42 and all of the reference waveforms. The similarity analyzer 141 employs, for each partial signal 42, as a similarity between the corresponding partial signal 42 and the reference waveforms, a similarity that is the largest among the similarities calculated for the corresponding partial signal 42. This similarity indicates a degree of similarity between the partial signal 42 and a reference waveform that is included in the plurality of waveforms and is the closest to the partial signal 42.

Figure 5:
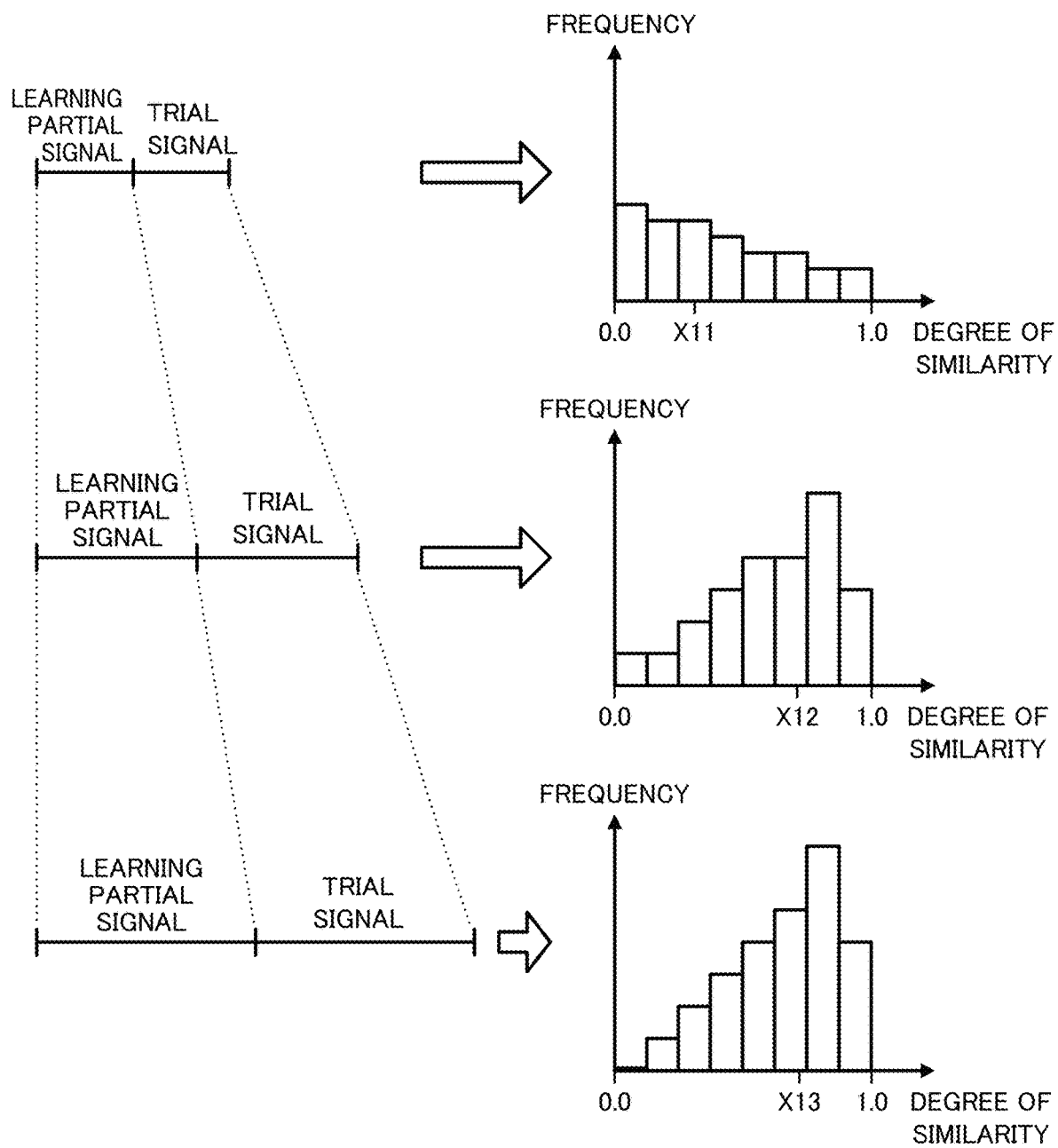
FIG. 5 is a diagram for explanation of a first index value according to the embodiment.

The similarity analyzer 141, with each learning by the learner 12 of the reference waveforms, calculates the similarities and generates the distribution of the similarities. FIG. 5 illustrates the learning signals that have different lengths and the frequency distributions that each are generated from the corresponding learning signal. As illustrated in FIG. 5, relatively low similarity is more often obtained as a result of calculation from a learning signal with a relative short length, due to insufficient learning of reference waveforms. Conversely, as the learning of reference waveforms progresses to a certain degree and calculation of similarities is performed from a learning signal with a greater length, relatively high similarity is more often obtained. When the learning proceeds sufficiently, the distribution becomes stable, and the shape of the distribution is maintained.

The similarity analyzer 141 outputs, as the first index value, a value relating to a frequency distribution of the similarities with respect to degrees of similarity. The first index value is a feature amount of the distribution, such as a centroid or scattering of the distribution. FIG. 5 illustrates centroids X11, X12, and X13 as the centroid of distribution. As is understandable from FIG. 5, an amount of change from the centroid X11 to the centroid X12 is large, whereas an amount of change from the centroid X12 to the centroid X13 is small. Thus the centroid of distribution serves as an index value indicating the progress status of the learning. Specifically, a determination for the progress status of the learning is made based on a relationship between the first index value that is derived from a preceding learning signal and relates to the distribution of similarities and the first index value derived from a present learning signal. The determination for the progress status of the learning is made based on, for example, a difference or a ratio between two first index values that are a first index value obtained in preceding processing and a first index value obtained in the present processing.

Again with reference to FIG. 1, each of the cluster analyzer 142 and the reference waveform analyzer 143 calculates index values that each indicate a characteristic of a corresponding cluster of the clusters that each include partial signals of the clustered partial signals.

Figure 6:
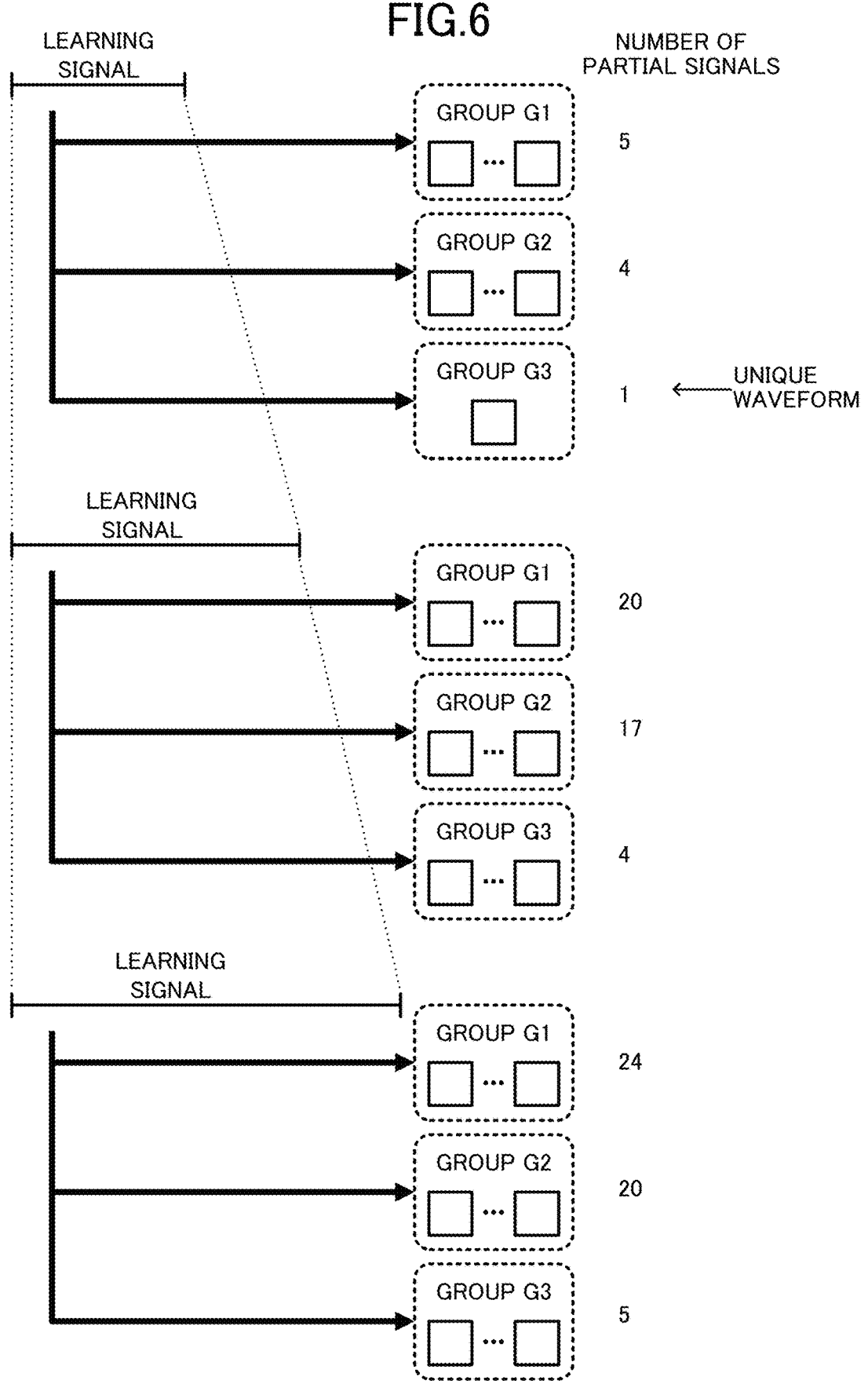
FIG. 6 is a diagram for explanation of a second index value according to the embodiment.

The cluster analyzer 142 calculates, for each group of the clustered partial signals, as a second index value indicating presence or absence of a unique waveform in the waveforms learned by the learner 12, a value relating to a number of partial signals included in the corresponding group. FIG. 6 illustrates the learning signals that have different lengths, and for each learning signal, numbers of partial signals that each indicate a number of partial signals cut out from the learning signal and belonging to a corresponding group of the clustered groups. As illustrated in FIG. 6, a learning signal with relatively short length leads to, due to insufficient learning of reference waveforms, the presence of a group G3 that includes just one partial signal. Such a group corresponds to the unique waveform included in the learning signal. In other words, when a unique waveform is present, learning is understood to be insufficient. When the learning of reference waveforms proceeds to a certain degree and the learning signal becomes long, the number of partial signals belonging to the group G3 becomes large.

The cluster analyzer 142 outputs, as the second index value, a number of groups that satisfy the condition that is the inclusion of partial signals that are fewer than a threshold value. An example value of the threshold value is 3. As is understandable from FIG. 6, the number of groups that satisfy the condition decreases as the learning proceeds. Thus the second index value serves as a value indicating the progress status of the learning. However, the second index value may be another value relating to the number of partial signals clustered into the various groups. For example, the second index value may be a ratio of (i) a number of groups including partial signals fewer in number than the threshold value to (ii) a number of all groups. Further, when the learning proceeds sufficiently, the number of groups that satisfy the condition is considered to be very small and stable. Thus the determination for the progress status of the learning may be made based on a relationship between a second index value derived from the preceding learning signal and a second index value derived from the present learning signal. The determination for the progress status of the learning is made based on, for example, a difference or a ratio between two second index values that are a second index value obtained in the preceding processing and a second index value obtained in the present processing.

Figure 7:
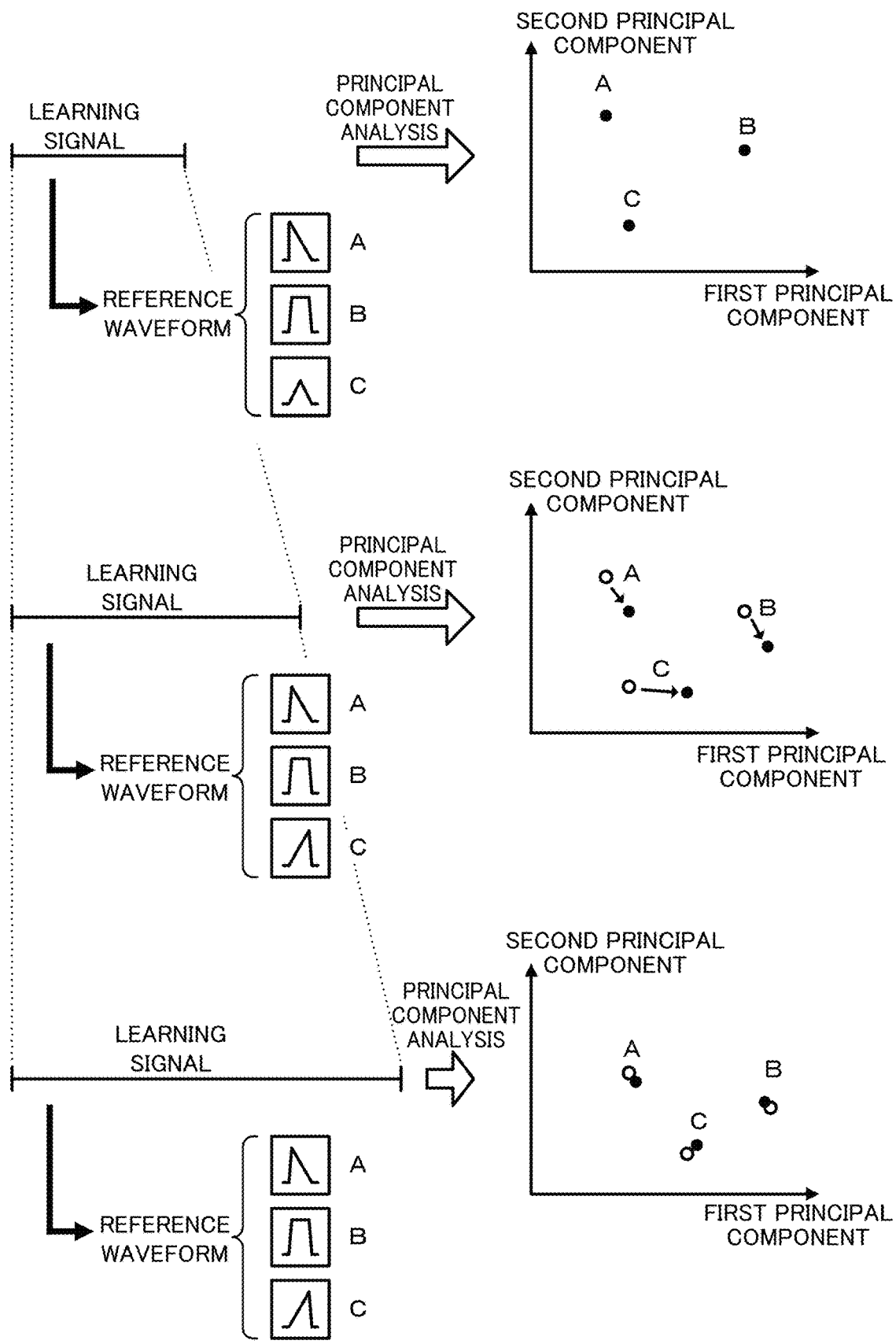
FIG. 7 is a diagram for explanation of a third index value according to the embodiment.

Again with reference to FIG. 1, the reference waveform analyzer 143 calculates the third index value using a distribution of multiple reference waveforms. Specifically, the reference waveform analyzer 143 calculates the third index value relating to a distribution of feature amounts that each are extracted from a corresponding reference waveform of the multiple reference waveforms. FIG. 7 illustrates the learning signals that have different lengths and results of principal component analyses that are performed for reference waveforms learned from the learning signals. For easy understanding of explanation below, FIG. 7 illustrates, as coordinate axes, a first principal component and a second principal component that are extracted from the reference waveforms.

As is understandable from FIG. 7, when the length of the learning signal increases from a relatively short length, the feature amounts distributed on a two-dimensional plane greatly change. In FIG. 7, the black points indicate feature amounts of reference waveforms learned from the present learning signal, and the outlined dots indicate feature amounts of reference waveforms learned from the preceding learning signal. Although the feature amounts distributed on the two-dimensional plane change even after the learning proceeds and the length of the learning signal further increases from a relatively long length, the moving amount of each feature amount becomes gradually small as the learning proceeds. Thus a value relating to such feature amounts serves as an index indicating the progress status of the learning.

The third index value may be, for example, a statistic such as an average or a variance in the distribution of the feature amounts, or a vector value representing the distribution of the feature amounts. According to the example of FIG. 7, a six-dimensional vector indicating three points distributed on the two-dimensional plane may be employed as the third index value. Further, the determination for the progress status of the learning may be made based on a relationship between a third index value derived from the preceding learning signal and a third index value derived from the present learning signal. The determination for the progress status of the learning is made based on, for example, a difference or a ratio between two third index values that are a third index value obtained in the preceding processing and a third index value obtained in the present processing. For example, a sum of moving amounts that each are a moving amount in the corresponding point illustrated in the example of FIG. 3 may be employed as the difference between two third index values.

Figure 8:
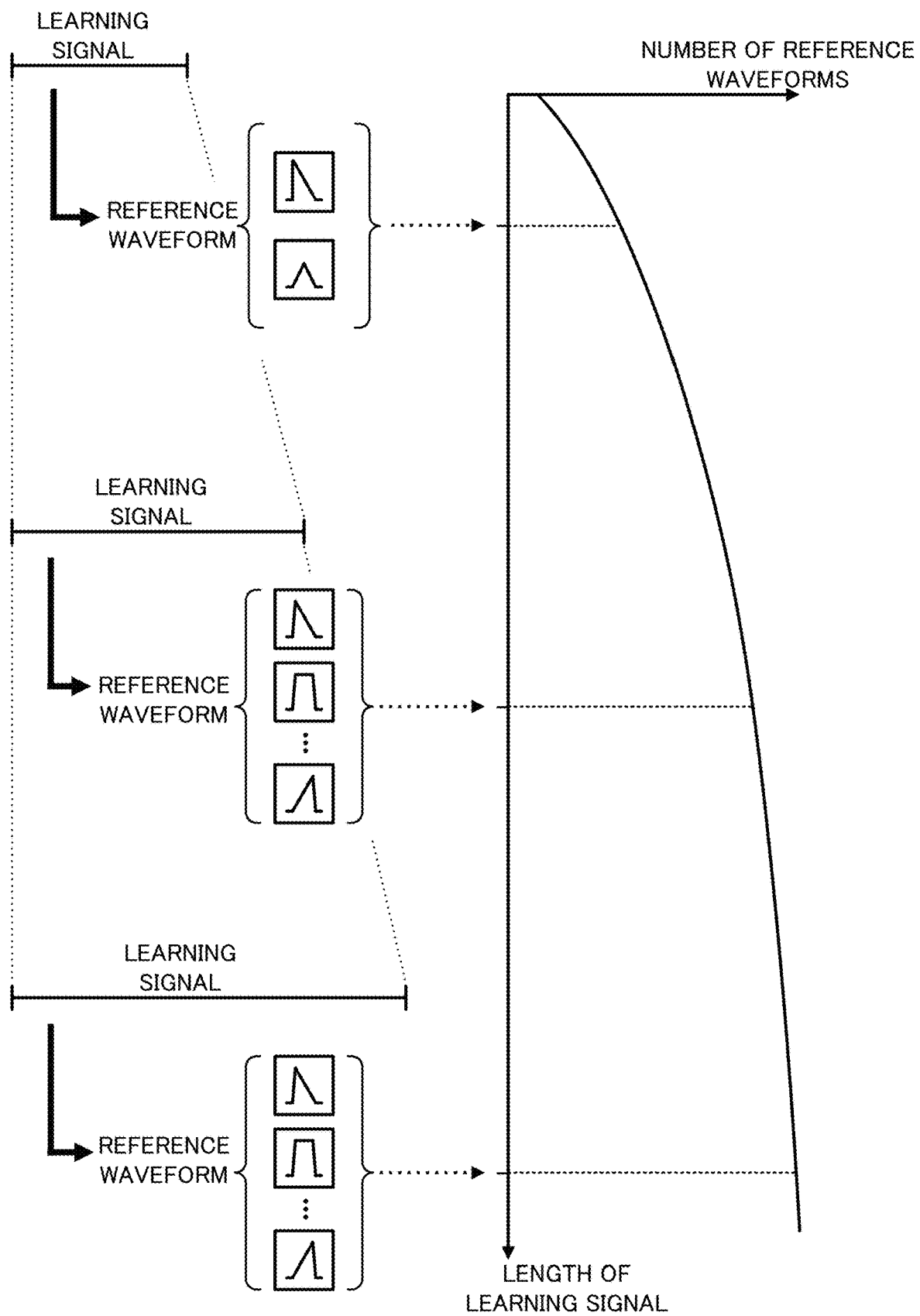
FIG. 8 is a diagram for explanation of a fourth index value according to the embodiment.

Again with reference to FIG. 1, the waveform number analyzer 144 calculates the fourth index value relating to the number of learned reference waveforms. FIG. 8 illustrates the learning signals that have different lengths and for each of the learning signals, a relationship between the learning signal and a number of reference waveforms learned from the corresponding learning signal. As is understandable from FIG. 8, a learning signal with relatively short length leads to, due to insufficient learning of reference waveforms, small number of learned reference waveforms. When the learning of waveforms proceeds to a certain degree and the learning signal becomes long, the number of newly-learned reference waveforms becomes small and an increase in the number of reference waveforms is less likely to occur. Thus a value relating to the number of reference waveforms serves as an index indicating the progress status of the learning.

The waveform number analyzer 144 may set the learned number of reference waveforms as the fourth index value, or may set as the fourth index value a value obtained by processing the learned number of reference waveforms. Further, the determination for the progress status of the learning may be made based on a relationship between a fourth index value derived from the preceding learning signal and a fourth index value derived from the present learning signal. Specifically, the determination for the progress status of the learning may be made based on a difference or a ratio between two fourth index values that are a fourth index value obtained in the preceding processing and a fourth index value obtained in the present processing.

Again with reference to FIG. 1, the progress information generator 145 calculates a combined index value that is obtained by combining the first index value, the second index value, the third index value, and the fourth index value. Specifically, the progress information generator 145 normalizes these index values and calculates a mean value of these index values, thereby obtaining the combined index value. Then the progress information generator 145 outputs, as the progress information, information relating to the combined information to the outputter 15. Further, the progress information generator 145 determines, based on the combined index value, whether to continue the learning, and outputs to the acquirer 11 the progress information indicating whether the learning is to be continued or stopped. The progress information indicating that the learning is to be stopped causes the acquirer 11 to stop acquiring of a new learning signal, thereby stopping the learning.

The outputter 15 outputs, to an exterior of the learning device 10, the progress information generated by the progress information generator 145. Specifically, the outputter 15 displays the progress information on a display screen, thereby presenting the progress information to the user. The progress information output by the outputter 15 may be information indicating a value of the combined index value or may be information that is generated based on the combined index value and indicates whether the learning is sufficiently performed.

The receiver 16 receives a stop instruction that is input by the user to stop the learning. The receiver 16 sends notification of the received stop instruction to the acquirer 11. This stop instruction causes the acquirer 11 to stop acquiring of a new learning signal, thereby stopping the learning.

Figure 9:
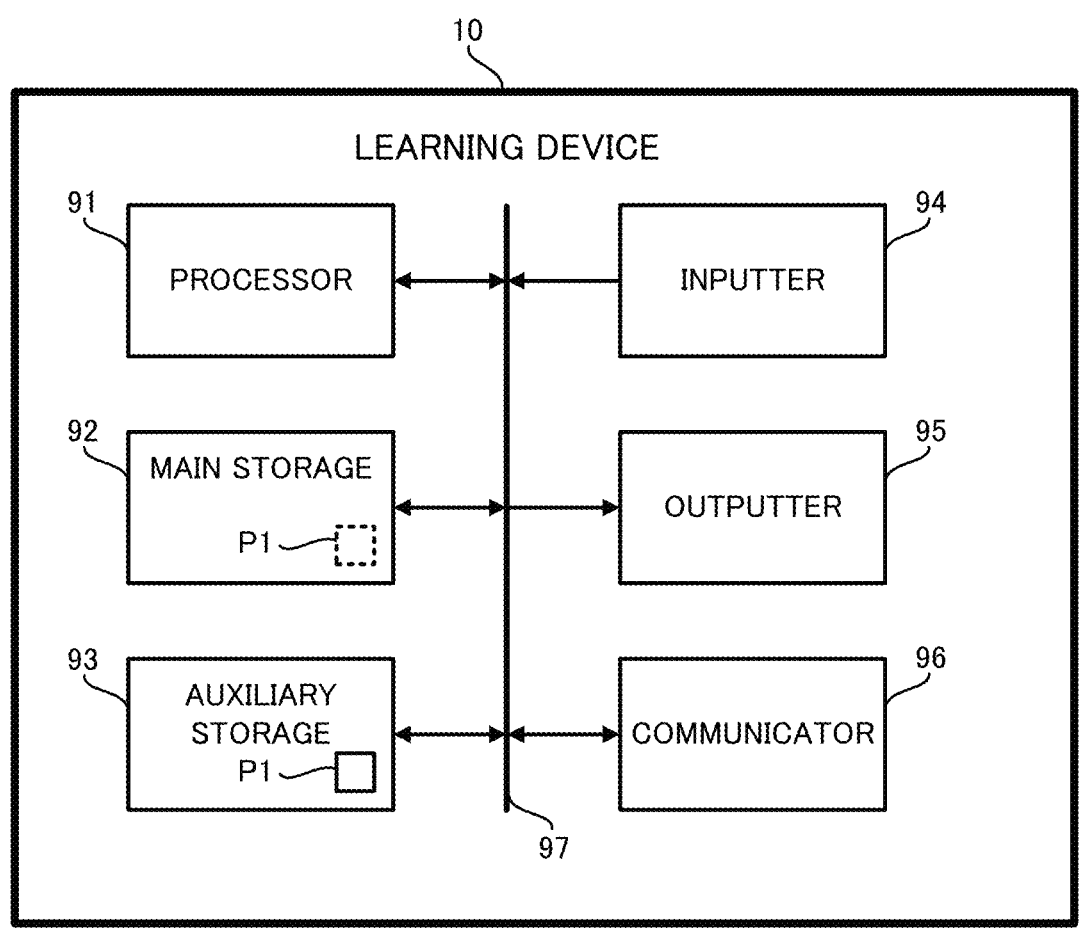
FIG. 9 is a block diagram illustrating hardware configuration of the learning device according to the embodiment.

As illustrated in FIG. 9, the learning device 10 includes, as hardware components, a processor 91, a main storage 92, an auxiliary storage 93, an inputter 94, an outputter 15, and a communicator 96. The main storage 92, the auxiliary storage 93, the inputter 94, the outputter 95, and the communicator 96 are connected to the processor 91 via an internal bus 97.

The processor 91 includes a central processing unit (CPU). The processor 91 executes a program P1 stored in the auxiliary storage 93 to achieve various types of functions of the learning device 10, thereby executing processing described later.

The main storage 92 includes random access memory (RAM). The program P1 is loaded from the auxiliary storage 93 into the main storage 92. The main storage 92 is used by the processor 91 as a work area.

The auxiliary storage 93 includes a nonvolatile memory such as an electrically erasable programmable read-only memory (EEPROM) and a hard disk drive (HDD). The auxiliary storage 93 stores the program P1 and various types of data used for processing by the processor 91. The auxiliary storage 93 supplies, in accordance with instructions from the processor 91, to the processor 91 data to be used by the processor 91 and stores data supplied from the processor 91. Although FIG. 9 illustrates in a representative manner only one program (that is, the program P1), the auxiliary storage 93 may store multiple programs, and multiple programs may be loaded into the main storage 92.

The inputter 94 includes an input device such as input keys and a pointing device. The inputter 94 acquires information input by a user of the learning device 10 and sends notification of the acquired information to the processor 91.

The outputter 95 includes an output device such as a liquid crystal display (LCD) and a speaker. The outputter 95 presents various types of information to the user in accordance with instructions from the processor 91.

The communicator 96 includes a network interface circuit for communicating with an external device. The communicator 96 receives a signal from the exterior and outputs data indicated by the signal to the processor 91. Further, the communicator 96 transmits to the external device a signal indicating data output from the processor 91.

The above-described functions of the learning device 10 are achieved by cooperation among the hardware components illustrated in FIG. 9. Specifically, the acquirer 11, the learner 12, and the generator 14 are achieved by the processor 91, the storage 13 is achieved by at least one of the main storage 92 or the auxiliary storage 93, the outputter 15 is achieved by the outputter 95, and the receiver 16 is achieved by the inputter 94. However, in the case where the acquirer 11 performs communication to acquire the learning signal from the exterior of the learning device 10, the acquirer 11 may be achieved by the processor 91 and the communicator 96.

Figure 10:
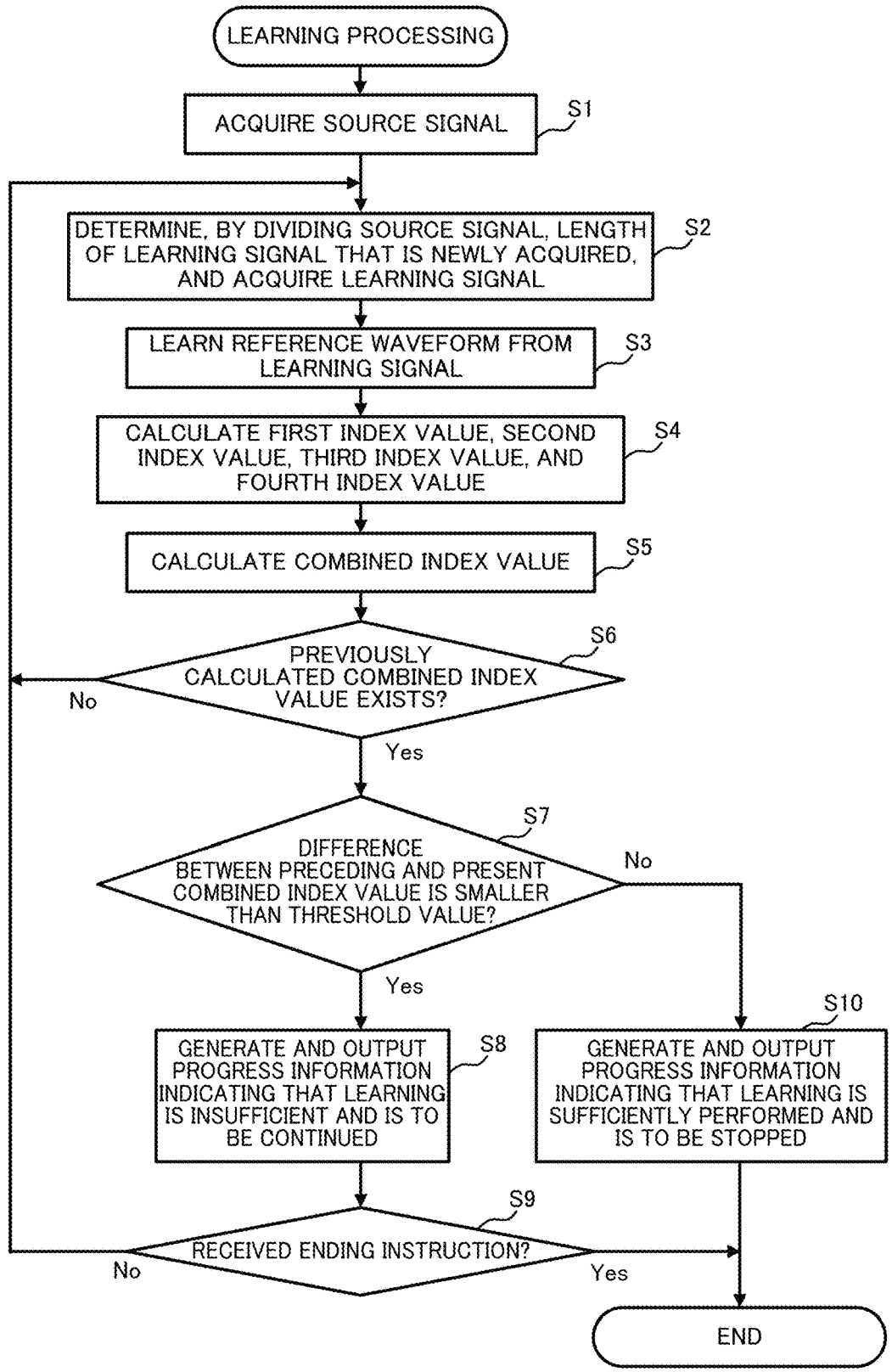
FIG. 10 is a flowchart of learning processing according to the embodiment.

Next, learning processing executed by the learning device 10 is described with reference to FIGS. 10-12. The learning processing illustrated in FIG. 10 is started upon startup by the user of a specific application installed in the learning device 10.

In the learning processing, the acquirer 11 acquires the source signal (step S1). Specifically, the acquirer 11 acquires the source signal by prompting the user to input the source signal or by requesting of the user an address of data including the source signal.

Then the acquirer 11 determines, by dividing the source signal, a length of the learning signal that is newly acquired, and acquires the learning signal (step S2). For example, in first execution of step S2, the acquirer 11 acquires the "learning signal acquired in the first acquisition illustrated in FIG. 2.

Then the learner 12 learns the reference waveforms from the learning signal (step S3). This step S3 corresponds to the learning step in the claims. Specifically, the learner 12 performs clustering of the partial signals cut out from the learning signal to learn the reference waveforms. This clustering includes two-phased clustering. Here, this clustering is described in detail with reference to FIGS. 11 and 12.

Figure 11:
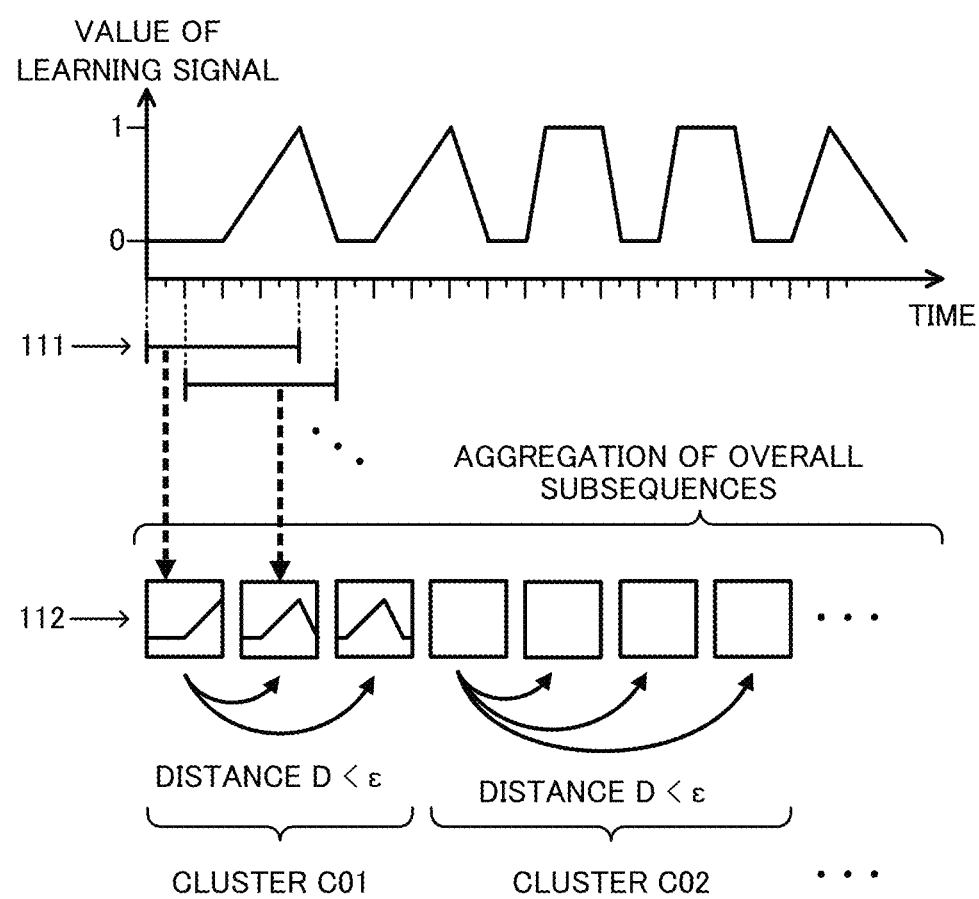
FIG. 11 is a diagram for explanation of first-phase clustering according to the embodiment.

FIG. 11 illustrates an outline of a first-phase clustering. In the first-phase clustering, the learner 12 puts together, as one cluster, partial signals that are cut out with intervals of the learning signal that are close to each other. Specifically, the learner 12, as illustrated in FIG. 11, obtains subsequences 112 that each are a partial signal cut out with each sliding operation of a window 111 with respect to the learning signal. The learner 12, when a distance D between one subsequence 112 and another subsequence 112 subsequent to the one subsequence 112 is smaller than a predetermined threshold value E, performs clustering of these subsequences 112 into one cluster, and calculates the distance D between still another subsequence 112 subsequent to the another subsequence 112. When the distance D between the one subsequence 112 and still another subsequence 112 is larger than the threshold value E, the learner 12 performs clustering of the still another subsequence 112 into a new cluster, and calculates the distance D relative to a yet further subsequence 112. The learner 12 repeatedly performs the above-described process, thereby clustering subsequences 112 that are adjacent to each other in a time direction and are close in distance therebetween.

Figure 12:
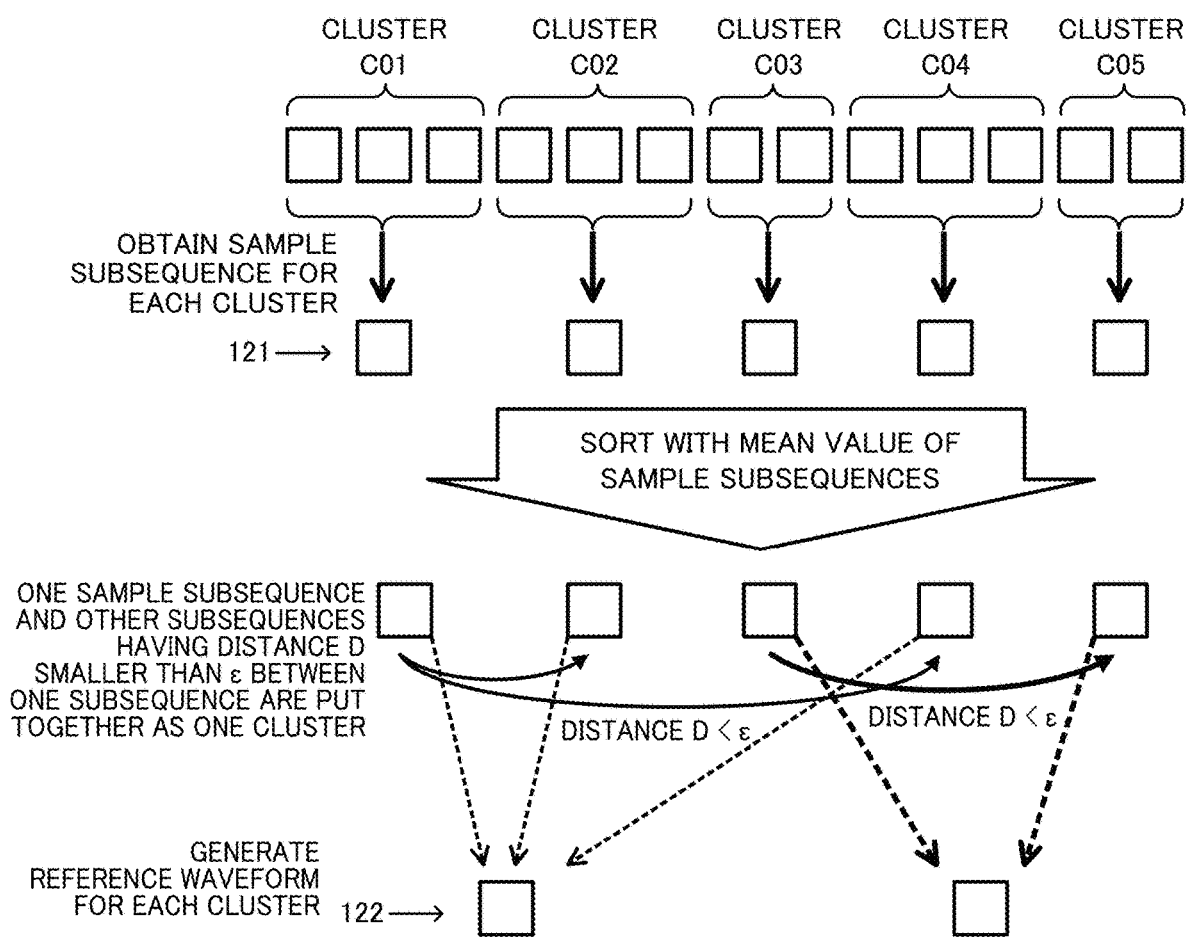
FIG. 12 is a diagram for explanation of second-phase clustering according to the embodiment.

FIG. 12 illustrates an outline of a second-phase clustering. In the second-phase clustering, the learner 12, for each cluster formed in the first-phase clustering, averages the subsequences 112 belonging to the corresponding cluster, to obtain sample subsequences 121 that each are representative of the corresponding cluster. Further, the learner 12 performs sorting in accordance with magnitude of an average value of the sample subsequences 121. Thereafter, the learner 12 performs clustering of the sample subsequences 121 in a manner similar to that in the first-phase clustering. The learner 12, for each cluster, averages the sample subsequences 121 belonging to the corresponding cluster, thereby obtaining reference waveforms 122.

Figure 3:
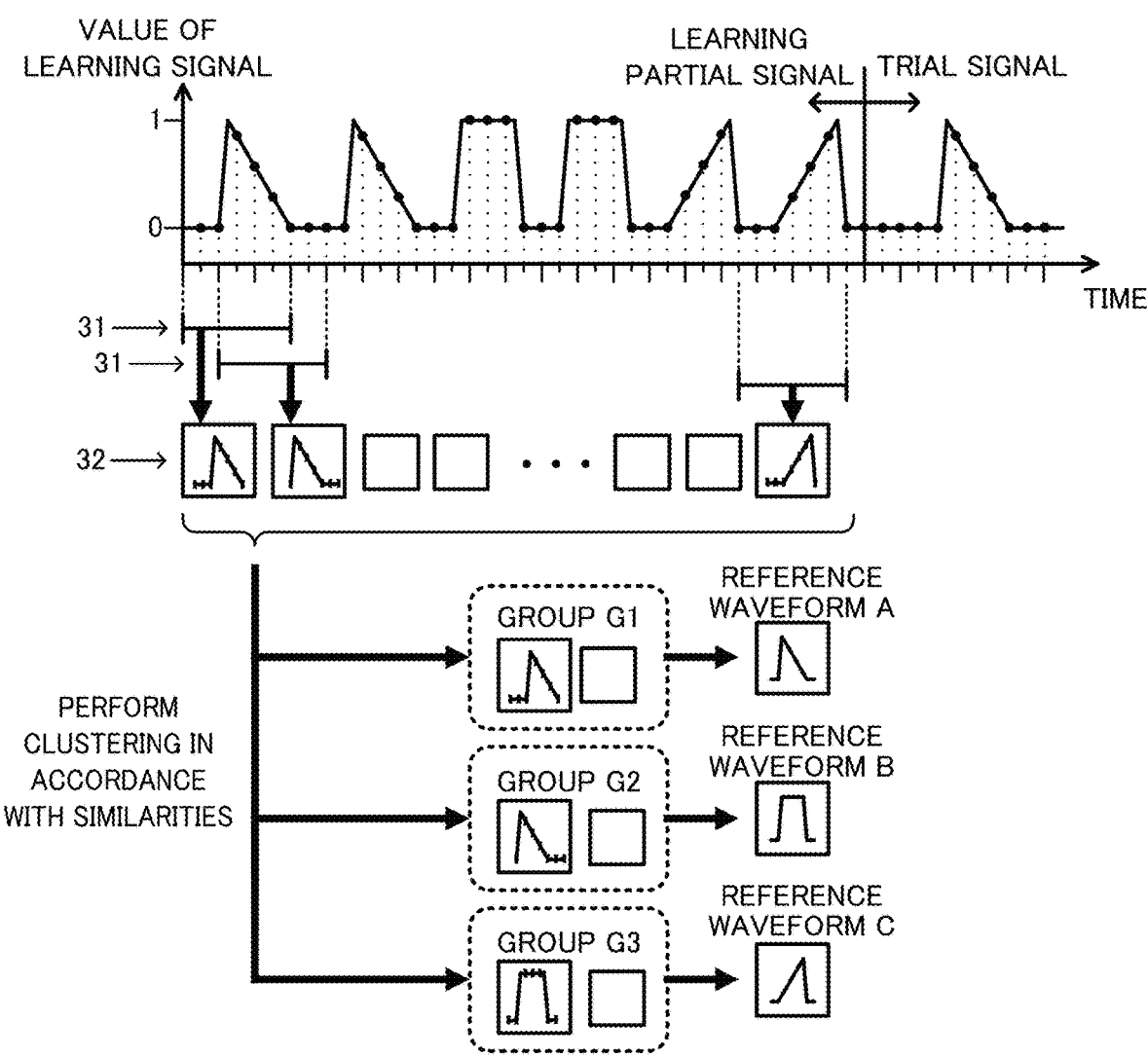
FIG. 3 is a diagram for explanation of learning of reference waveform performed by a learner according to the embodiment.

In the case where, as illustrated in FIG. 3, the preceding learning signal corresponds to a part of the learning signal acquired after the preceding learning signal as a result of repetitive acquisition, a result of the first-phase clustering performed with respect to the preceding learning signal can be appropriated for clustering of the learning signal. The learner 12 holds the result of the first-phase clustering as already-learned intermediate data, and then performs the first-phase clustering for an unlearned part that is included in the learning signal and for which the first-phase clustering is not already performed. Thereafter, the learner 12 performs the second-phase clustering based on the result of both the preceding first-phase clustering and the present first-phase clustering. The subsequences 112 generated from the unlearned part are adjacent to each other in time, and the already-learned part and the unlearned part are adjacent at only one point on the temporal axis. Thus a result can be obtained that is almost the same as a result obtained in the case in which all the first-phase clustering is performed again. Further, as most of the first-phase clustering can be omitted, reduction in calculation amount can be achieved.

Again with reference to FIG. 10, following step S3, the generator 14 calculates the first index value, the second index value, the third index value, and the fourth index value (step S4), and calculates the combined index value (step S5). Specifically, the generator 14 calculates the centroid of the distribution of similarities as the first index value, counts the number of groups that satisfy the condition as the second index value, calculates the average value of a distribution of feature amounts extracted from the reference waveforms as the third index value, and counts the number of the reference waveforms as the fourth index value. The generator 14, by calculating an average value of these four index values after normalizing these four index values to values between zero and 1, calculates the combined index value.

Then the generator 14 determines whether a previously-calculated combined index value exists (step S6). Specifically, the generator 14 determines whether a combined index value calculated before the calculation of the combined index value in step S5 exists.

When a determination is made that step S6 is executed for the first time and thus no preceding combined index value exists (NO in step S6), the learning device 10 repeats the processing in step S2 and beyond. This leads to learning of reference waveforms from a new learning signal and another calculation of the combined index value.

Conversely, when a determination is made that a preceding combined index value exists (YES in step S6), the generator 14 determines whether a difference between the preceding combined value and the present index value is smaller than a threshold value (step S7). This threshold value may be a predetermined value or may be modified by the user.

When the determination is step S7 is positive (YES in step S7), the generator 14 outputs the progress information indicating that learning is insufficient and the learning is to be continued (step S8). This step S8 corresponds to the generating step in the claims. Specifically, the generator 14 outputs, to the outputter 15, the progress information indicating that learning is insufficient and outputs, to the acquirer 11, the progress information indicating that the learning is to be continued.

Then the receiver 16 determines whether an ending instruction to end the learning is received from the user (step S9). When a determination is made that the ending instruction is not received (NO in step S9), the learning device 10 repeats the processing in step S2 and beyond. This leads to acquisition by the acquirer 11 of a new learning signal and continuation of learning of reference waveforms.

Conversely, when a determination is made that the ending instruction is received (YES in step S9), the learning device 10 ends the learning processing, thereby ending the learning of the reference waveforms.

When the determination in step S7 is negative (NO in step S7), the generator 14 generates the progress information indicating that learning is sufficiently performed and the learning is to be stopped, and outputs the progress information (step S10). This step S10 corresponds to the generating step in the claims. Specifically, the generator 14 outputs, to the outputter 15, the progress information indicating that learning is sufficiently performed and outputs, to the acquirer 11, the progress information indicating that the learning is to be stopped. This stops acquisition by the acquirer 11 of a new learning signal and ends the learning processing.

As described above, by use of the learning device 10, the reference waveforms are learned from the learning signal, and thus the progress information is generated based on at least one of a distribution of similarities or characteristics of cluster that each include corresponding partial signals of the clustered partial signals. Utilizing the distribution of similarities and the characteristics of clusters can achieve the obtaining of more accurate progress information, and utilizing such progress information can achieve, when learning of reference waveforms performed as a result of clustering based on the similarities progresses to a certain degree, termination of the learning. Thus, termination of learning for comparing signal waveforms at a more appropriate point in time can be achieved.

Furthermore, the learning device 10 generates the progress information based on an index value relating to the distribution of similarities calculated for the trial signal. The distribution of similarities calculated for the trial signal is an appropriate measure representing progress in learning and thus enables accurate representation by the progress information of a progress status of learning.

Furthermore, the learning device 10 generates the progress information based on an index value relating to the number of partial signals that each are clustered into a corresponding group during learning. The number of partial signals that each are clustered into a corresponding group is an appropriate measure representing progress in learning and thus enables accurate representation by the progress information of the progress status of learning.

Furthermore, the learning device 10 generates the progress information based on an index value relating to the distribution of feature amounts that each are extracted from a corresponding reference waveform of multiple reference waveforms. The distribution of such feature amounts is an appropriate measure representing progress in learning and thus enables accurate representation by the progress information of the progress status of learning.

Furthermore, the learning device 10 generates the progress information based on the index value relating to the number of learned reference waveforms. Such number of reference waveforms is an appropriate measure representing progress in learning and thus enables accurate representation by the progress information of the progress status of learning.

Furthermore, the learning device 10 obtains the combined index value based on multiple index values and generates the progress information based on the combined index value. This enables more accurate representation by the progress information of the progress status of learning in comparison to the employment of any one of the multiple index values alone.

Although an embodiment of the present disclosure is described above, the present disclosure is not limited to the above-described embodiment.

Figure 13:
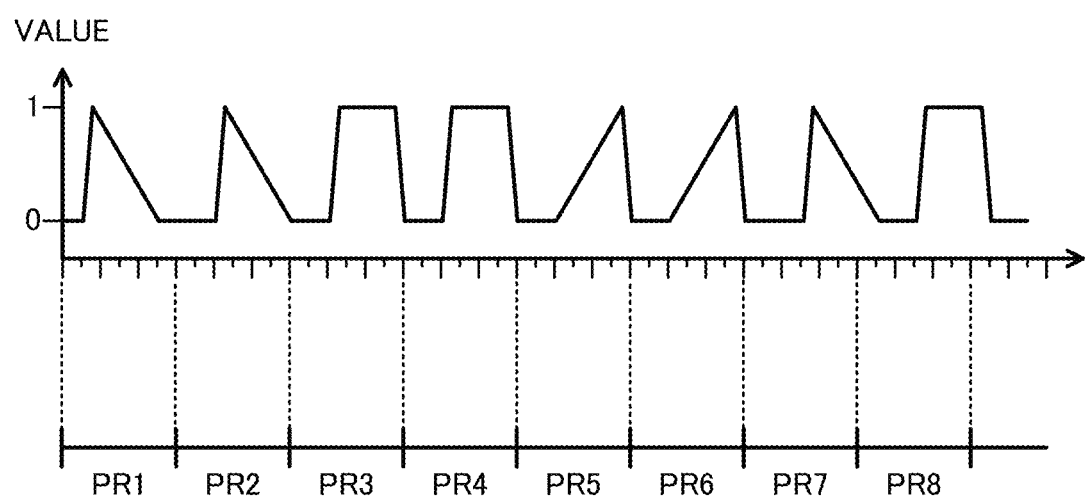
FIG. 13 is a diagram for explanation of dividing of a source signal according to a modified example.

For example, although the acquirer 11 acquires a new learning signal by, as illustrated in FIG. 2, performing division of a part of the source signal corresponding to an interval obtained by appending the unlearned interval adjacent to the previously divided interval, this is not limiting, and any methods that can divide the source signal may be employed. For example, learning signals may be acquired in ascending order by length by dividing the source signal in advance into intervals PR1-PR8 that, as illustrated in FIG. 13, do not overlap each other, acquiring a signal corresponding to the interval PR1 in a first acquisition, and adding, in subsequent acquisitions, other signals corresponding to intervals into which the source signal is divided.

Figure 14:
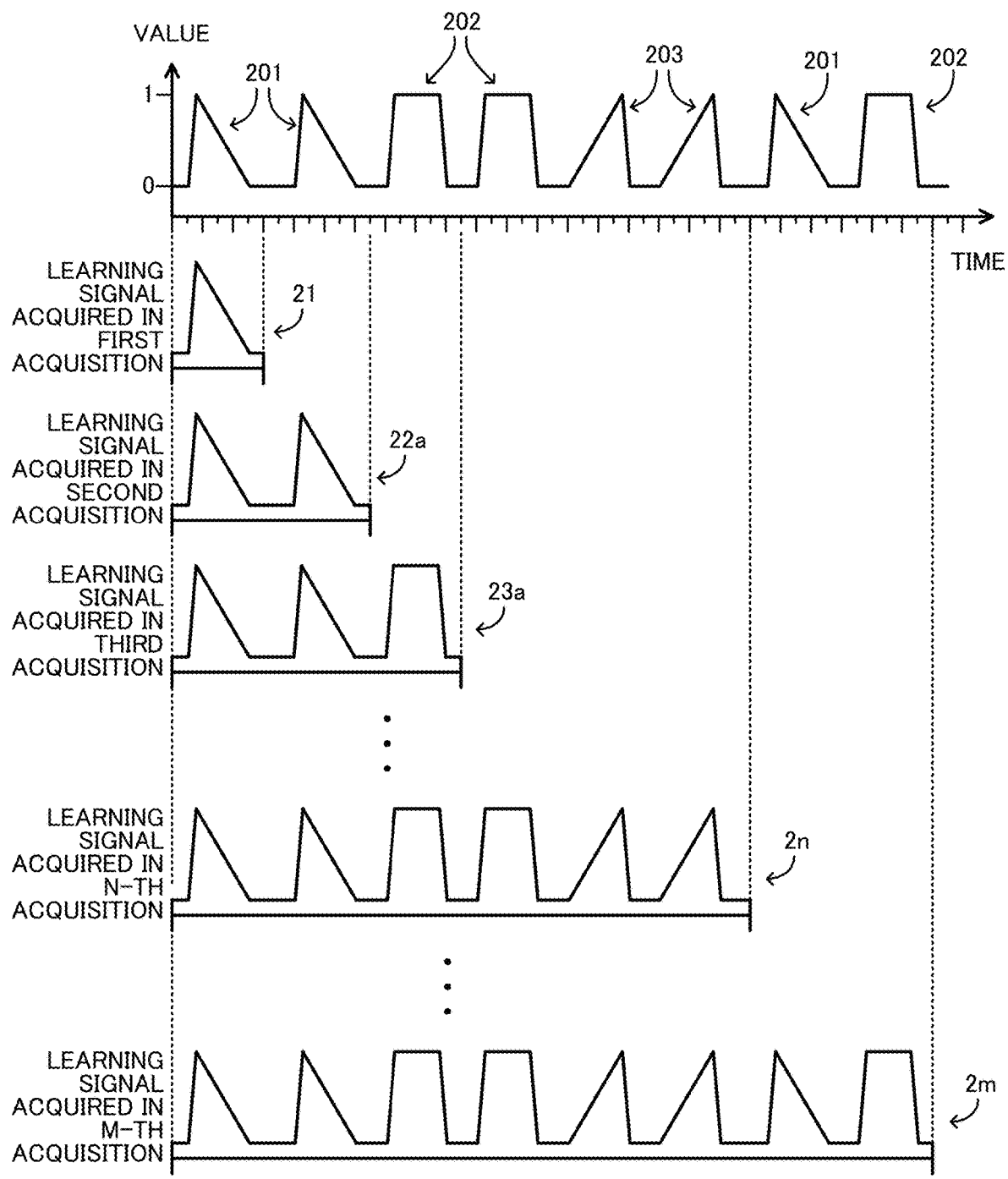
FIG. 14 is a diagram for explanation of acquisition of learning signals according to a modified example.

Furthermore, the acquirer 11 may determine a length of the newly-acquired learning signal based on signal waveforms. For example, in the example illustrated in FIG. 2, the learning signal 22 includes the waveform 201 partially and the learning signal 23 includes the waveform 202 partially, and this configuration may lead to inefficient learning of reference waveforms. Thus the acquirer 11 may, contrary to the example of FIG. 2, as illustrated in FIG. 14, divide the source signal at points of intervals at which a signal value takes zero and acquire a learning signal 22a that includes the waveform 201 entirely and a learning signal 23a that includes the waveform 202 entirely.

Furthermore, although an example in which the acquirer 11 acquires a learning signal by dividing the source signal is described, this is not limiting. For example, the acquirer 11 may acquire a learning signal by, after a determination is made that learning is to be continued, sending to the exterior a request for the learning signal.

Furthermore, although an example in which the acquirer 11 acquires a learning signal repeatedly is described, this example is not limiting. The acquirer 11 may acquire and prepare multiple learning signals in advance, and the learner 12 may select, with each learning as a result of repetitive learning, any one of the multiple learning signals.

Furthermore, learning signals acquired as a result of repetitive acquisition may or may not overlap.

Furthermore, in performing clustering of the partial signals, a distance is employed as a measure indicating degrees of similarity between waveforms. However, the measure employed in performing clustering is not limited to the distance and may be freely selected. For example, a measure similar to the similarities calculated by the similarity analyzer 141 may be employed to perform clustering of the partial signals. Further, the similarity calculated by the similarity analyzer 141 may be a measure indicating the distance.

Furthermore, although an example in which the similarity is a value that ranges from zero to 1 and takes a value of 1 in the case of matching of waveforms, this is not limiting, and any measure that indicate the degree of similarity between waveforms can be employed as the similarity. Specifically, a similarity that decreases as waveforms become similar to each other, such as a similarity that ranges from zero to 1 and takes a value of zero in the case of matching of waveforms, may be employed. Further, the range of the similarity may be freely modified. For example, a similarity between one waveform and another waveform may be set as a sum of square errors between sampling values of the waveforms.

Furthermore, although an example in which the learner 12 performs two-phased clustering is described, this example is not limiting. For example, clustering of partial signals may be performed by the learner 12 using k-means clustering or by employment of a Gaussian mixture model (GMM).

Furthermore, although in the aforementioned learning processing a determination of the learning status is made based on a result of the determination as to whether a difference between combined index values is smaller than the threshold value, this configuration is not limiting. For example, a ratio between the combined index values is considered to converge on 1 when the learning proceeds to a certain degree. Thus the determination of the learning status may be made by determining whether a ratio between the combined index values is within a predetermined error range from 1. Further, the determination for the learning status may be made, using a method different from the determination based on a difference or a ratio, based on a relationship between the combined index value obtained in the present processing and a combined index value that is obtained in previous processing.

Furthermore, the learning processing executed by the learning device 10 is not limited to the processing illustrated in FIG. 10. For example, the learning device 10 may execute the learning processing illustrated in FIG. 15. In this learning processing, the acquirer 11 acquires a learning signal (step S11), and the learner 12 learns reference waveforms from the learning signal (step S3). Then the generator 14 calculates the first index value, the second index value, the third index value, and the fourth index value (step S4), and selects a representative index value (step S12).

The representative index value is one index value selected from the calculated four index values. The representative index value may be selected by the user or may be selected based on values of the calculated four index values. For example, an index value with the largest or the smallest value may be selected as the representative index value.

Then the generator 14 outputs, as the progress information, information indicating the selected representative index value (step S13). This allows the user to grasp the progress status of the learning.

Then the receiver 16 determines whether an ending instruction is received (step S9). When a determination is made that the ending instruction is received (YES in step S9), the learning processing ends and the learning of reference waveforms stops.

Conversely, when a determination is made that the ending instruction is not received (NO in step S9), the acquirer 11 adds a new signal to the leaning signal and acquires a learning signal with a length longer than that of the preceding learning signal (step S14). Thereafter, the learning device 10 repeats the processing in step S3 and beyond.

Figure 15:
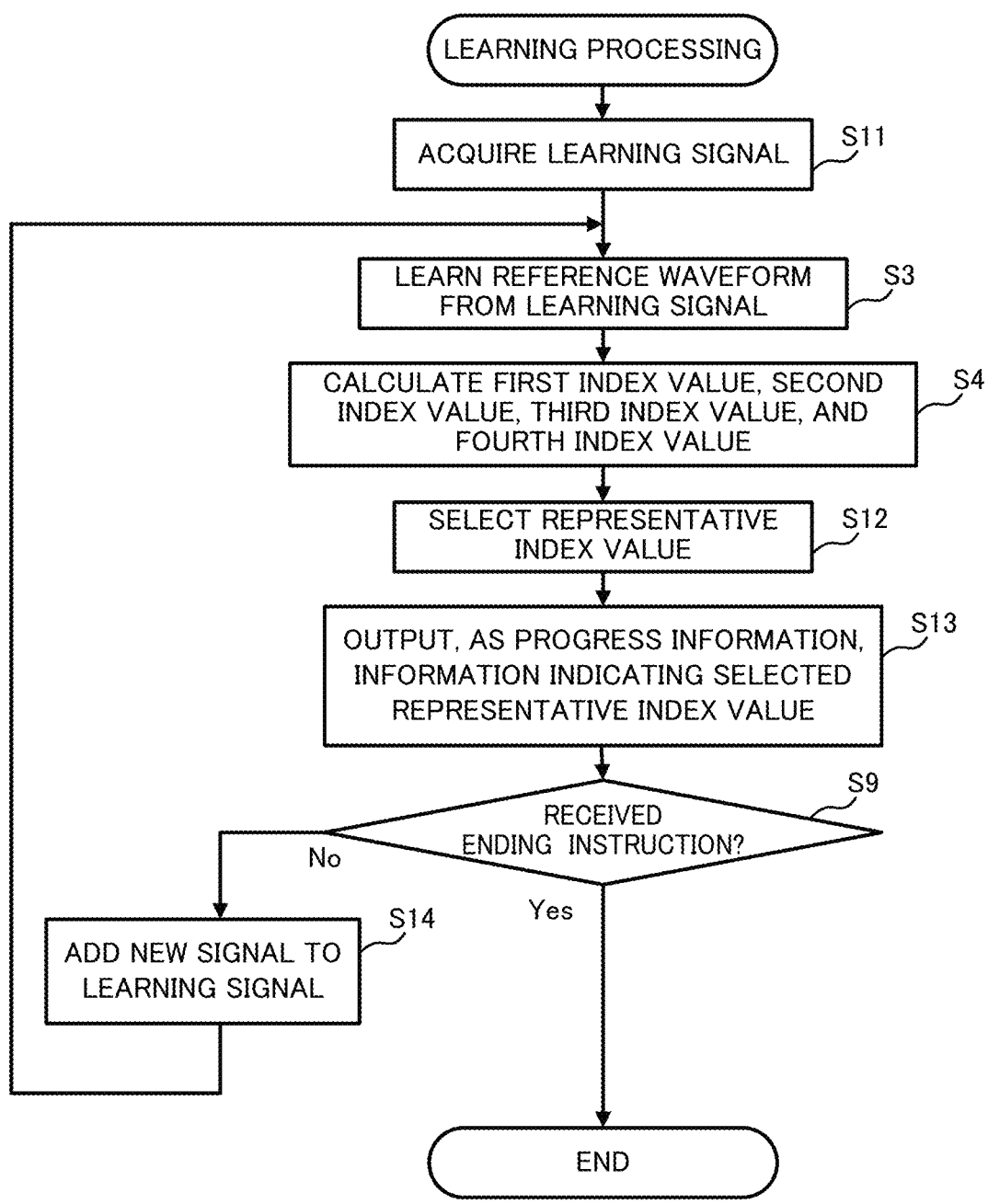
FIG. 15 is a flow chart of learning processing according to a modified example.

According to the learning processing illustrated in FIG. 15, the use can, while checking the progress information, stop the learning at a freely-selected timing.

Furthermore, although an example of combining four index values and an example of selecting one of the four index values are described, these examples are not limiting, and any combination of the four index values may be employed. Further, combining of index values may be performed using the aforementioned four index values and a fifth index value that is different from the aforementioned four index values.

Furthermore, although an example is described in which the progress information indicates whether the learning is sufficiently performed, this example is not limiting. For example, an index value larger than a first threshold value may be referred to as a "low" degree of progress in learning, an index value smaller than the first threshold value and larger than a second threshold value may be referred to as a "medium" degree of progress in learning, and an index value smaller than the second threshold value may be referred to as a "high" degree of progress in learning, and progress information indicating to which phase of multiple phases the degree of progress in learning belongs may be then generated. The number of the multiple phases may be freely modified.

Furthermore, the functions of the learning device 10 can be achieved by dedicated hardware or by a normal computer system.

For example, distributing the program P1 to be executed by the processor 91 by storing the program P1 in a non-transitory computer-readable recording medium and then installing the program P1 on a computer can achieve a device for executing the above-described processing. A flexible disk, a compact disc read-only memory (CD-ROM), a digital versatile disc (DVD), and a magneto-optical (MO) disc are conceivable as examples of such a recording medium.

Furthermore, the program P1 may be stored in a disk device included in a server device on a communication network such as the Internet and may be downloaded onto a computer, for example, by superimposing the program P1 on a carrier wave.

Furthermore, the above-described processing can also be achieved by starting and executing the program P1 while transferring the program P1 through the communication network.

Furthermore, the above-described processing can also be achieved by executing all or a portion of the program P1 on the server device and by executing, using the computer, a program while transmitting and receiving information relating to the processing via the communication network.

In the case where the above-described functions are implemented by an operating system (OS) by allotment to the OS or are implemented by cooperation between the OS and an application, for example, storage and distribution on the medium of only portions of the program P1 other than a portion of the program P1 executed by the OS is permissible. Alternatively, such portions of the program P1 may be downloaded to a computer.

Furthermore, means for achieving the functions of the learning device 10 is not limited to software, and a part of or all of the functions may be achieved by dedicated hardware including a circuit.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitable for learning of a signal waveform.

REFERENCE SIGNS LIST

10 Learning device
11 Acquirer
12 Learner
13 Storage
14 Generator
141 Similarity analyzer
142 Cluster analyzer
143 Reference waveform analyzer
144 Waveform number analyzer
145 Progress information generator
15 Outputter
16 Receiver
16 Communicator
21, 22, 22a, 23, 23a, 2n, 2m Learning signal
201-203 Waveform
31, 41 Window
32, 42 Partial signal
91 Processor
92 Main storage
93 Auxiliary storage
94 Inputter
95 Outputter
96 Communicator
97 Internal bus
111 Window
112 Subsequence
121 Sample subsequence
122 Reference waveform
P1 Program

The invention claimed is:

1. A learning device comprising processing circuitry configured as:
    an acquirer to acquire a learning signal;
    a learner to (i) perform, in accordance with first similarities indicating degrees of similarity between waveforms, clustering of a plurality of partial signals cut out from the learning signal acquired by the acquirer and (ii) learn reference waveforms that each indicate a waveform of a corresponding partial signal of the clustered partial signals; and
    a generator to (i) generate, based on a feature amount of a distribution of second similarities indicating degrees of similarity between a trial signal included in the learning signal and the reference waveforms learned from a learning partial signal included in the learning signal, progress information indicating a progress status of the learning by the learner and (ii) output the progress information.

2. The learning device according to claim 1, wherein
    the generator calculates, for each of a plurality of partial signals cut out from the trial signal, the second similarities indicating degrees of similarity between the corresponding partial signal and the reference waveforms and generates the progress information based on the distribution of the second similarities.

3. The learning device according to claim 2, wherein the generator generates the progress information based on a frequency distribution with respect to degrees of the second similarity.

4. The learning device according to claim 1, wherein
    the acquirer acquires a plurality of the learning signals, and
    the generator generates the progress information based on a relationship between (i) an index value that is obtained when the learner learns the reference waveforms from one learning signal of the plurality of learning signals and (ii) another index value that is obtained when the learner learns the reference waveforms from another learning signal of the plurality of learning signals, the index values relating to the distribution of the second similarities.

5. The learning device according to claim 4, wherein the generator generates, when a difference between the index values is smaller than a threshold value, the progress information indicating that the learning of the reference waveforms is sufficiently performed.

6. A learning device comprising processing circuitry configured as:
    an acquirer to acquire a learning signal;
    a learner to (i) perform, in accordance with first similarities indicating degrees of similarity between waveforms, clustering of a plurality of partial signals cut out from the learning signal acquired by the acquirer and (ii) learn reference waveforms that each indicate a waveform of a corresponding partial signal of the clustered partial signals; and a generator to (i) generate, based on at least one of a feature amount of a distribution of second similarities indicating degrees of similarity between a trial signal included in the learning signal and the reference waveforms learned from a learning partial signal included in the learning signal and characteristics of clusters that each include a corresponding partial signal of the clustered partial signals, progress information indicating a progress status of the learning by the learner and (ii) output the progress information, wherein the acquirer acquires the learning signal repeatedly by, subsequent to acquisition of one learning signal, acquiring another learning signal with a length based on a waveform of the one learning signal, and the generator generates the progress information based on a relationship between (i) an index value that is obtained when the learner learns the reference waveforms from one learning signal and (ii) another index value that is obtained when the learner learns the reference waveforms from another learning signal, the index values relating to at least one of the distribution of the second similarities and the characteristics of the clusters.

7. A learning device comprising processing circuitry configured as:

an acquirer to acquire a learning signal;

a learner to (i) perform, in accordance with first similarities indicating degrees of similarity between waveforms, clustering of a plurality of partial signals cut out from the learning signal acquired by the acquirer and (ii) learn reference waveforms that each indicate a waveform of a corresponding partial signal of the clustered partial signals; and a generator to (i) generate, based on at least one of a feature amount of a distribution of second similarities indicating degrees of similarity between a trial signal included in the learning signal and the reference waveforms learned from a learning partial signal included in the learning signal and characteristics of clusters that each include a corresponding partial signal of the clustered partial signals, progress information indicating a progress status of the learning by the learner and (ii) output the progress information, wherein the acquirer acquires the learning signal repeatedly by, subsequent to acquisition of one learning signal, acquiring another learning signal with a length longer than a length of the one learning signal, and the generator generates the progress information based on a relationship between (i) an index value that is obtained when the learner learns the reference waveforms from one learning signal and (ii) another index value that is obtained when the learner learns the reference waveforms from another learning signal, the index values relating to at least one of the distribution of the second similarities and the characteristics of the clusters.

8. The learning device according to claim 1, wherein the generator generates and outputs the progress information indicating whether the learning of the reference waveforms is to be continued, the acquirer acquires a new learning signal when the progress information indicates that the learning is to be continued, and the learner learns the reference waveforms from the new learning signal.

9. A learning method comprising:

a learning step of (i) performing, in accordance with first similarities indicating degrees of similarity between waveforms, clustering of a plurality of partial signals cut out from a learning signal and (ii) learning reference waveforms that each indicate a waveform of a corresponding partial signal of the clustered partial signals; and a generating step of (i) generating, based on a feature amount of a distribution of second similarities indicating degrees of similarity between a trial signal included in the learning signal and the reference waveforms learned from a learning partial signal included in the learning signal, progress information indicating a progress status of the learning and (ii) outputting the progress information.

10. A non-transitory computer-readable recording medium storing a program causing a computer to implement:

performing, in accordance with first similarities indicating degrees of similarity between waveforms, clustering of a plurality of partial signals cut out from a learning signal, and learn reference waveforms that each indicate a waveform of a corresponding partial signal of the clustered partial signals; and generating, based on a feature amount of a distribution of second similarities indicating degrees of similarity between a trial signal included in the learning signal and the reference waveforms learned from a learning partial signal included in the learning signal, progress information indicating a progress status of the learning, and output the progress information.

11. A learning method comprising:

an acquisition step of acquiring a learning signal;

a learning step of (i) performing, in accordance with first similarities indicating degrees of similarity between waveforms, clustering of a plurality of partial signals cut out from the learning signal and (ii) learning reference waveforms that each indicate a waveform of a corresponding partial signal of the clustered partial signals; and a generating step of (i) generating, based on at least one of a feature amount of a distribution of second similarities indicating degrees of similarity between a trial signal included in the learning signal and the reference waveforms learned from a learning partial signal included in the learning signal and characteristics of clusters that each include a corresponding partial signal of the clustered partial signals, progress information indicating a progress status of the learning and (ii) outputting the progress information, wherein the acquisition step includes acquiring the learning signal repeatedly by, subsequent to acquisition of one learning signal, acquiring another learning signal with a length based on a waveform of the one learning signal, and the generating step includes generating the progress information based on a relationship between (i) an index value that is obtained by the learning of the reference waveforms from one learning signal in the learning step and (ii) another index value that is obtained by the learning of the reference waveforms from another learning signal in the learning step, the index values relating to at least one of the distribution of the second similarities and the characteristics of the clusters.

12. A learning method comprising:

an acquisition step of acquiring a learning signal;

a learning step of (i) performing, in accordance with first similarities indicating degrees of similarity between waveforms, clustering of a plurality of partial signals cut out from the learning signal and (ii) learning reference waveforms that each indicate a waveform of a corresponding partial signal of the clustered partial signals; and a generating step of (i) generating, based on at least one of a feature amount of a distribution of second similarities indicating degrees of similarity between a trial signal included in the learning signal and the reference waveforms learned from a learning partial signal included in the learning signal and characteristics of clusters that each include a corresponding partial signal of the clustered partial signals, progress information indicating a progress status of the learning and (ii) outputting the progress information, wherein the acquisition step includes acquiring the learning signal repeatedly by, subsequent to acquisition of one learning signal, acquiring another learning signal with a length longer than a length of the one learning signal, and the generating step includes generating the progress information based on a relationship between (i) an index value that is obtained by the learning of the reference waveforms from one learning signal in the learning step and (ii) another index value that is obtained by the learning of the reference waveforms from another learning signal in the learning step, the index values relating to at least one of the distribution of the second similarities and the characteristics of the clusters.

13. A non-transitory recording computer-readable medium storing a program causing a computer to implement:

acquiring a learning signal repeatedly by, subsequent to acquisition of one learning signal, acquiring another learning signal with a length based on a waveform of the one learning signal;

performing, in accordance with first similarities indicating degrees of similarity between waveforms, clustering of a plurality of partial signals cut out from the learning signal and learn reference waveforms that each indicate a waveform of a corresponding partial signal of the clustered partial signals; and generating, based on a relationship between (i) an index value that is obtained when the reference waveforms are learned from one learning signal and (ii) another index value that is obtained when the reference waveforms are learned from another learning signal, progress information indicating a progress status of the learning, the index values relating to at least one of a feature of a distribution of the second similarities and the characteristics of the clusters.

14. A non-transitory computer-readable recording medium storing a program causing a computer to implement:

acquiring a learning signal repeatedly by, subsequent to acquisition of one learning signal, acquiring another learning signal with a length longer than a length of the one learning signal;

performing, in accordance with first similarities indicating degrees of similarity between waveforms, clustering of a plurality of partial signals cut out from the learning signal and learn reference waveforms that each indicate a waveform of a corresponding partial signal of the clustered partial signals; and generating, based on a relationship between (i) an index value that is obtained when the reference waveforms are learned from one learning signal and (ii) another index value that is obtained when the reference waveforms are learned from another learning signal, progress information indicating a progress status of the learning, the index values relating to at least one of a feature of a distribution of the second similarities and the characteristics of the clusters.

15. The learning device according to claim 1, wherein the feature amount of the distribution of the second similarities is a centroid of the distribution of the second similarities.

16. The learning device according to claim 1, wherein the feature amount of the distribution of the second similarities indicates a scattering amount of the distribution of the second similarities.

* * * * *